United States Patent
Kawai (10) Patent No.: US 9,793,540 B2
(45) Date of Patent: Oct. 17, 2017

(54) POSITIVE ELECTRODE ACTIVE MATERIAL FOR NONAQUEOUS ELECTROLYTE SECONDARY BATTERY AND METHOD OF PRODUCING THE SAME

(71) Applicant: NICHIA CORPORATION, Anan-shi, Tokushima (JP)

(72) Inventor: Kenta Kawai, Tokushima (JP)

(73) Assignee: NICHIA CORPORATION, Anan-Shi, Tokushima (JP)

(*) Notice: Subject to any disclaimer, the term of this patent is extended or adjusted under 35 U.S.C. 154(b) by 294 days.

(21) Appl. No.: 14/568,346

(22) Filed: Dec. 12, 2014

(65) Prior Publication Data

US 2015/0171424 A1 Jun. 18, 2015

(30) Foreign Application Priority Data

Dec. 13, 2013 (JP) .................................. 2013-257531
Dec. 2, 2014 (JP) .................................. 2014-244263

(51) Int. Cl.
*H01M 4/36* (2006.01)
*H01M 4/04* (2006.01)
*H01M 4/131* (2010.01)
*H01M 4/525* (2010.01)
*H01M 4/62* (2006.01)
*H01M 4/1391* (2010.01)

(52) U.S. Cl.
CPC .......... *H01M 4/366* (2013.01); *H01M 4/0471* (2013.01); *H01M 4/131* (2013.01); *H01M 4/1391* (2013.01); *H01M 4/525* (2013.01); *H01M 4/628* (2013.01)

(58) Field of Classification Search
CPC ...... H01M 4/131; H01M 4/134; H01M 4/139; H01M 4/366; H01M 4/505; H01M 4/52; H01M 4/523; H01M 4/0471; H01M 4/1391; H01M 4/525
See application file for complete search history.

(56) References Cited

U.S. PATENT DOCUMENTS

| | | | | |
|---|---|---|---|---|
| 2008/0131778 A1* | 6/2008 | Watanabe | ............ | H01M 4/131 429/220 |
| 2010/0273057 A1* | 10/2010 | Watanabe | ............ | H01M 4/131 429/223 |
| 2013/0309580 A1* | 11/2013 | Tomura | ............... | H01M 4/131 429/304 |
| 2014/0087270 A1* | 3/2014 | Yoshida | ............... | H01M 4/485 429/304 |
| 2014/0329146 A1* | 11/2014 | Niina | ................... | H01M 4/505 429/223 |

FOREIGN PATENT DOCUMENTS

| | | | |
|---|---|---|---|
| JP | 2000-315502 A | | 11/2000 |
| JP | 2002-75363 A | | 3/2002 |
| JP | 2009-146739 A | | 7/2009 |
| JP | 2010-40383 A | | 2/2010 |
| WO | WO 2012/105048 | * | 8/2012 |
| WO | WO 2012/160698 | * | 11/2012 |
| WO | WO 2013/015069 | * | 1/2013 |

\* cited by examiner

Primary Examiner — Anca Eoff
(74) Attorney, Agent, or Firm — Andrews Kurth Kenyon LLP (57) ABSTRACT

The present invention provides a positive electrode active material for non-aqueous electrolyte secondary battery comprising:

core particles comprising a lithium transition metal composite oxide represented by the general formula:

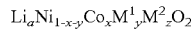

$Li_aNi_{1-x-y}Co_xM^1_yM^2_zO_2$ wherein $1.00 \leq a \leq 1.50$, $0.00 \leq x \leq 0.50$, $0.00 \leq y \leq 0.50$, $0.00 \leq z \leq 0.02$, $0.00 \leq x+y \leq 0.70$, $M^1$ is at least one element selected from the group consisting of Mn and Al, $M^2$ is at least one element selected from the group consisting of Zr, Ta, Nb and Mo, and a surface layer located on a surface of the core particles, and the surface layer comprising boron, tungsten and oxygen;

wherein the surface layer is obtained by heat-treating the core particles; a raw material compound (1) that is at least one compound selected from the group consisting of boron oxide, an oxo acid of boron, and a salt of an oxo acid of boron; and tungsten oxide (VI).

10 Claims, 3 Drawing Sheets

POSITIVE ELECTRODE ACTIVE MATERIAL FOR NONAQUEOUS ELECTROLYTE SECONDARY BATTERY AND METHOD OF PRODUCING THE SAME

CROSS-REFERENCE TO RELATED APPLICATIONS

This application claims priority to Japanese Patent Application No. 2013-257531 filed on Dec. 13, 2013, and No. 2014-244263 filed on Dec. 2, 2014. The entire disclosure of Japanese Patent Application No. 2013-257531 and No. 2014-244263 are hereby incorporated herein by reference.

BACKGROUND OF THE INVENTION

Field of the Invention

The present invention relates to a positive electrode active material used in non-aqueous electrolyte secondary batteries, such as a lithium ion secondary battery and a method of producing the same.

Description of the Related Art

In recent years, mobile devices such as VTR, mobile phone and note PC have been spreading and miniturization of those have been in progress. For the power source of those mobile devices, a non-aqueous electrolyte secondary batteries, such as a lithium ion secondary battery has been employed. Furthermore, the non-aqueous electrolyte secondary battery has attracted a great deal of attention as a power battery for electric vehicles and the like so as to cope with recent environmental problems.

There has widely been employed, as a positive electrode active material for a lithium secondary battery, lithium cobalt oxide that can constitute a 4V class secondary battery.

Cobalt, that is a constituent component of a raw material for lithium cobalt oxide, is a scarce resource and the regions of cobalt deposits are also unevenly distributed, which leads to high costs and causes anxiety about supply of the raw material.

In response to these circumstances, lithium transition metal composite oxides which have a stacked-layer structure such as nickel-cobalt-lithium manganate in which a part of Co in lithium cobalt oxide is substituted with other metals such as Ni and Mn, have been developed.

There have been technologies for incorporating a specific polyvalent metal on the surface of particles of a lithium transition metal composite oxide for various purposes. The type of polyvalent metal and the way to contain the polyvalent metal differ variously according to purposes.

JP 2002-75367A describes lithium composite oxide powder which is subjected to a coating treatment to form a surface layer containing Li and at least one element selected from the group consisting of Mo and W, in order to achieve both high initial charge-discharge capacity and heat stability. More specifically, JP 2002-75367A describes a method in which a lithium nickelate-based composite oxide with part of Ni substituted with Co and Al, and $Li_2MoO_4$ or $Li_2WO_4$ are mixed and the mixture is subjected to a hear treatment at 714° C. or 752° C.

JP 2000-315502A describes a positive electrode active material in which, in order to improve safety at occurrence of internal short circuit, at least one element selected from V, Nb, W, Mo, and the like is contained in a composite oxide which contains lithium and nickel as the main components. More specifically, JP 2002-75367A describes a method in which a lithium nickelate-based composite oxide with part of Ni substituted with Co and Al, and $Nb_2O_5$ or $V_2O_5$ or the like are suspended in a lithium nitride solution, then subjected to wet crushing and spray drying to give granulated particles, which is then subjected to a hear treatment at 800° C.

In addition to those, there has been a technique of incorporating boron into the surface of lithium transition metal composite oxide.

JP 2009-146739A discloses a technology in which on the surfaces of lithium transition metal composite oxide particles which contains nickel or cobalt as an essential component, a boric acid compound such as ammonium borate, lithium borate, or the like, is deposited, and is subjected to heat-treatment under an oxidation atmosphere to obtain high capacity of a secondary battery and to improve discharging efficiency and charging efficiency of of the secondary battery. In JP 2009-146739, only lithium nickelate in which a part of nickel is substituted with cobalt and aluminum is disclosed as lithium transition metal composite oxide.

SUMMARY OF THE INVENTION

A positive electrode active material for non-aqueous electrolyte secondary battery comprising:

core particles comprising a lithium transition metal composite oxide represented by the general formula:

wherein 1.00≤a≤1.50, 0.00≤x≤0.50, 0.00≤y≤0.50, 0.00≤z≤0.02, 0.00≤x+y≤0.70, $M^1$ is at least one element selected from the group consisting of Mn and Al, $M^2$ is at least one element selected from the group consisting of Zr, Ta, Nb and Mo, and a surface layer located on a surface of the core particles, and the surface layer comprising boron, tungsten and oxygen;

wherein the surface layer is obtained by heat-treating the core particles; a raw material compound (1) that is at least one compound selected from the group consisting of boron oxide, an oxo acid of boron, and a salt of an oxo acid of boron; and tungsten oxide (VI).

With the use of a positive electrode active material according to the embodiments of the present invention, the amount of gas generated in a nonaqueous electrolyte secondary battery during a high temperature storage can be reduced.

BRIEF DESCRIPTION OF THE DRAWINGS

FIG. 3 is images including an secondary electron image (1), backscattered electron image (2), elemental distribution image for tungsten (3) and elemental distribution image for boron (4) using electron beam microanalyzer (EPMA)

regarding an example of a positive electrode active material for comparison which does not contain tungsten in the surface layer.

DETAILED DESCRIPTION OF THE INVENTION

Along with the progression of technology in nonaqueous electrolyte secondary batteries, the applicable fields for the nonaqueous electrolyte secondary batteries are expanding while the volume of the nonaqueous electrolyte secondary batteries per capacitance has been decreasing. Consequently, influence of the change in the volume of the nonaqueous electrolyte secondary batteries to its surroundings has been increased more than ever. The main cause of the change in the volume of the nonaqueous electrolyte secondary batteries is the gas generated in the batteries.

Particularly, the necessity to decrease the amount of gas generated during a high-temperature preservation of the nonaqueous electrolyte secondary batteries has become stronger than ever. However, the nonaqueous electrolyte secondary batteries which employ such a positive electrode active material described in JP 2002-075367A, JP 2000-315502A, and JP 2009-146739A, the amount of gas generated during a high temperature preservation cannot be reduced to a degree that is required.

Under these circumstances, the present invention has been made. An aim therefore is to provide a positive electrode active material which can reduce the generation of gas during a high-temperature preservation of a nonaqueous electrolyte secondary battery, and to provide a method of producing the positive electrode active material.

The present inventors have intensively studied so as to improve the above-mentioned characteristics, and thus the present invention has been completed. The present inventors have found that the amount of gas generated during a high temperature storage can be reduced in a nonaqueous electrolyte secondary battery which employs a positive electrode composition which has core particles of a lithium transition metal composite oxide which has a layered structure containing nickel, and has a surface layer located on the surface of the core particles and contains boron, tungsten and oxygen in a specific state.

The present disclosure includes embodiments as described below.

(1) A positive electrode active material for non-aqueous electrolyte secondary battery comprising:

core particles comprising a lithium transition metal composite oxide represented by the general formula:

wherein 1.00≤a≤1.50, 0.00≤x≤0.50, 0.00≤y≤0.50, 0.00≤z≤0.02, 0.00≤x+y≤0.70, M¹ is at least one element selected from the group consisting of Mn and Al, M² is at least one element selected from the group consisting of Zr, Ta, Nb and Mo, and a surface layer located on a surface of the core particles, and the surface layer comprising boron, tungsten and oxygen;

wherein the surface layer is obtained by heat-treating the core particles; a raw material compound (1) that is at least one compound selected from the group consisting of boron oxide, an oxo acid of boron, and a salt of an oxo acid of boron; and tungsten oxide (VI).

(2) A method of producing a positive electrode active material for non-aqueous electrolyte secondary battery, the method comprising:

mixing core particles; a raw material compound (1) that is at least one compound selected from the group consisting of boron oxide, an oxo acid of boron, and a salt of an oxo acid of boron; and tungsten oxide (VI) to obtain a raw material mixture, wherein the core particles comprise a lithium transition metal composite oxide represented by the general formula:

wherein 1.00≤a≤1.50, 0.00≤x≤0.50, 0.00≤y≤0.50, 0.00≤z≤0.02, 0.00≤x+y≤0.70, M¹ is at least one element selected from the group consisting of Mn and Al, M² is at least one element selected from the group consisting of Zr, Ta, Nb and Mo; and heat-treating the raw material mixture to obtain a heat-treated product.

With the use of a positive electrode active material according to the embodiments of the present invention, the amount of gas generated in a nonaqueous electrolyte secondary battery during a high temperature storage can be reduced. Further, the positive electrode active material according to the embodiments can improve output characteristics of a nonaqueous electrolyte secondary battery.

In the present specification, the term "step" means not only an independent step but also a step which cannot be clearly distinguished from the other steps but can achieve the desired object thereof. Further, with respect to the amount of a component contained in the composition, when a plurality of materials are present in the composition as the components of the composition, the amount of the components means the total amount of the materials present in the composition unless otherwise specified.

The positive electrode active material of the present invention will be described in more detail below by way of the Embodiments and Examples.

<Positive Electrode Active Material For Nonaqueous Electrolyte Secondary Battery>

A positive electrode active material for non-aqueous electrolyte secondary battery comprises core particles comprising a lithium transition metal composite oxide represented by the general formula: Li$_a$Ni$_{1-x-y}$Co$_x$M$^1_y$M$^2_z$O$_2$ wherein 1.00≤a≤1.50, 0.00≤x≤0.50, 0.00≤y≤0.50, 0.00≤z≤0.02, 0.00≤x+y≤0.70, M¹ is at least one element selected from the group consisting of Mn and Al, M² is at least one element selected from the group consisting of Zr, Ta, Nb and Mo, and a surface layer located on a surface of the core particles, and the surface layer comprising boron, tungsten and oxygen; wherein the surface layer is obtained by heat-treating the core particles; a raw material compound (1) that is at least one compound selected from the group consisting of boron oxide, an oxo acid of boron, and a salt of an oxo acid of boron; and tungsten oxide (VI).

<Core Particle>

The core particles comprises a lithium transition metal composite oxide with a layer-structure represented by the general formula described above. The core particles may have a part of the nickel site of LiNiO$_2$ substituted with cobalt, manganese, and/or aluminum. The core particles may also further contains zirconium, titanium, magnesium, tantalum, niobium, tungsten, and/or molybdenum in its lithium transition metal composite oxide.

The variable x satisfies 0.00≤x≤0.50. When x exceeds 0.50, the producing cost is increased. The variable x preferably satisfies 0.00<x≤0.50, and more preferably satisfies 0.05≤x≤0.35. When the variable x is 0.35 or less, the reduction of the producing cost can be achieved. When the variable x is 0.05 or more the balance of various characteristics is improved.

$M^1$ is at least one of Mn and Al. $M^1$ is preferably Mn. Further, the variable y satisfies $0.00 \leq y \leq 0.50$. When the variable y exceeds 0.50, it may result in a deterioration of output characteristics and charge-discharge capacity of the nonaqueous electrolyte secondary battery which employs the positive electrode active material. The variable y preferably satisfies $0.00 < y \leq 0.50$, and more preferably satisfies $0.05 \leq y \leq 0.35$.

The variables x and y satisfy $0.00 \leq x+y \leq 0.70$. When the variable x+y exceeds 0.70, the amount of nickel in the positive electrode active material is decreased. Therefore, the charge-discharge capacity of the nonaqueous electrolyte secondary battery is decreased. The variables x and y preferably satisfy $0.00 < x+y \leq 0.70$, and more preferably satisfy $0.20 \leq x+y \leq 0.60$, for the reason of improvement in the balance of various characteristics.

$M^2$ is at least one element selected from the group consisting of Zr, Ti, Mg, Ta, Nb, W and Mo. In $M^2$, for example, tungsten may be selected for improving the output characteristics, zirconium may be selected for improving the preservation characteristics, and titanium and magnesium may be selected for improving the cycle characteristics. $M^2$ is preferably at least one element selected from the group consisting of Zr, Ti, Mg, and W, and is more preferably Zr.

The variable z satisfies $0.00 \leq z \leq 0.02$. When the variable z exceeds 0.02, the improvement obtained by $M^1$ is hindered and the aim of containing $M^2$ can not be achieved.

The variable a satisfies $1.00 \leq a \leq 1.50$. When the variable a is less than 1.00, satisfactory output characteristics is not obtained. On the other hand, when the variable a exceeds 1.50, synthesis of the core particles made of a lithium transition metal composite oxide may become difficult. Further, core particles made of a lithium transition metal composite oxide with the variable a in excess of 1.50 may be synthesized but the handling of the sintered body tends to be difficult. The variable a preferably satisfies $1.05 \leq a \leq 1.25$ for the reason of easy-to synthesize a lithium transition metal composite oxide. When the variable a satisfies $1.05 \leq a \leq 1.25$, synthesizing of a lithium transition metal composite oxide can be more facilitated and balance of various characteristics can be improved.

The diameter of the core particle is not specifically limited, and may be about 3 μm to about 20 μm as a median diameter. In the specification, the median diameter corresponds to the 50% of the integrated value in the volume distribution curve. The median diameter can be measured by using a known method for measuring such as a laser diffraction method.

The core particles can be synthesized by appropriately using known techniques. The core particles can be obtained by using a method which comprises, for example, preparing a raw material mixture and calcining the raw material mixture. Examples of the method of preparing a raw material mixture comprise a method which comprise mixing raw material compounds according to a target composition, and a method which comprises dissolving raw material components in a solvent to create a reaction field, adjusting the temperature and/or the pH of the reaction field, and/or adding a complexing agent in the reaction field to induce precipitation of a precursor, thus obtaining a raw material mixture. The calcination temperature is not specifically limited but 700° C. to 1100° C. is preferable.

The raw material compound of the core particles is not specifically limited as long as it can be decomposed to produce oxides at a high temperature. Examples of such raw material compound include a lithium compound, a cobalt compound, a compound of $M^1$ (a manganese compound, an aluminum compound), and a compound of $M^2$ (a tungsten compound, a zirconium compound, or the like), which may be an oxide, a carbonate, a hydroxide, a nitride, a sulphate, or the like.

<Surface Layer>

The surface layer is located on the surface of the core particles and comprises boron, tungsten and oxygen, and can be obtained by heat treating the core particles; a raw material compound (1) that is at least one compound selected from the group consisting of boron oxide, oxo-acid of boron, and salt of oxo-acid of boron; and tungsten oxide (VI). It is thought that in the surface layer which is obtained by heat treating the core particles; a raw material compound (1) that is at least one selected from the group consisting of boron oxide, oxo-acid of boron, and salt of oxo-acid of boron; and tungsten oxide (VI), at least a part of elements in the surface layer is chemically bonded with the element which constitutes the core particles.

In the case where the core particles are used as positive electrode active material, a small amount of unreacted lithium compound (lithium carbonate etc.) tends to remain on the surface of the core particles. The unreacted lithium compound poses one of the main causes of generation of gas. By heat treatment, the element on the surface of the core particles comprising the unreacted lithium compound is thought to react with the raw material compound (1), and/or tungsten oxide (VI), and thus, as a result, the cause of generation of gas is eliminated. Further, by the heat treatment, the lithium ion conductivity of the surface layer becomes higher than the lithium ion conductivity of the surface of the core particles. For this reason, the output characteristics of the non-aqueous electrolyte secondary battery of the present embodiment is improved compared to the output characteristics of the non-aqueous electrolyte secondary battery which employs only the core particles as the positive electrode active material.

The surface layer is not necessarily cover the entire surface of the core particles. The formation of the surface layer can be confirmed by the presence of the elements which constitute the surface layer, on at least a certain region (which is to a degree so as not to be visually determined as being present only at specific locations) of the core particles. That is, the surface of the positive electrode active material includes a region of the core particles which is a lithium transition metal composite oxide and represented by the general formula, and a region of the surface layer. The state of each element of the surface layer (distribution of the elements, bonding state between the elements, or the like) can be confirmed by using X-ray photoelectron spectroscopic analysis (XPS), Auger spectroscopic analysis (AES), Electron beam microanalyzer (EPMA), or the like.

Figure 1:
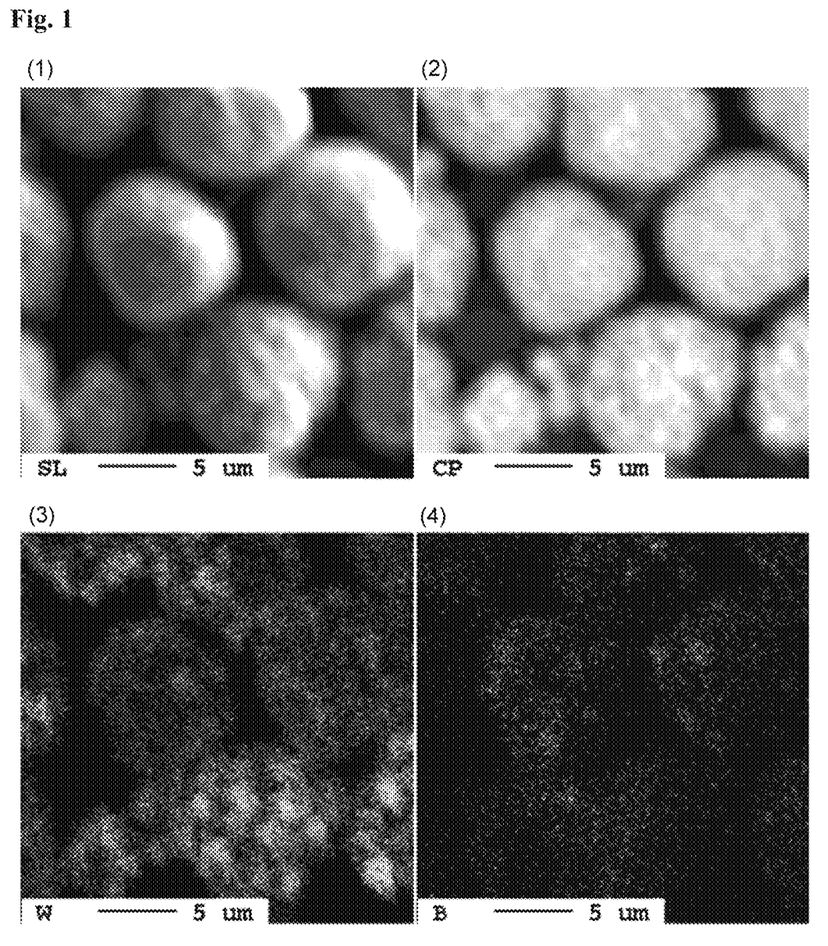
FIG. 1 is images including an secondary electron image (1), backscattered electron image (2), elemental distribution image for tungsten (3) and elemental distribution image for boron (4) using electron beam microanalyzer (EPMA) regarding an example of a positive electrode active material according to the present embodiment.
Figure 2:
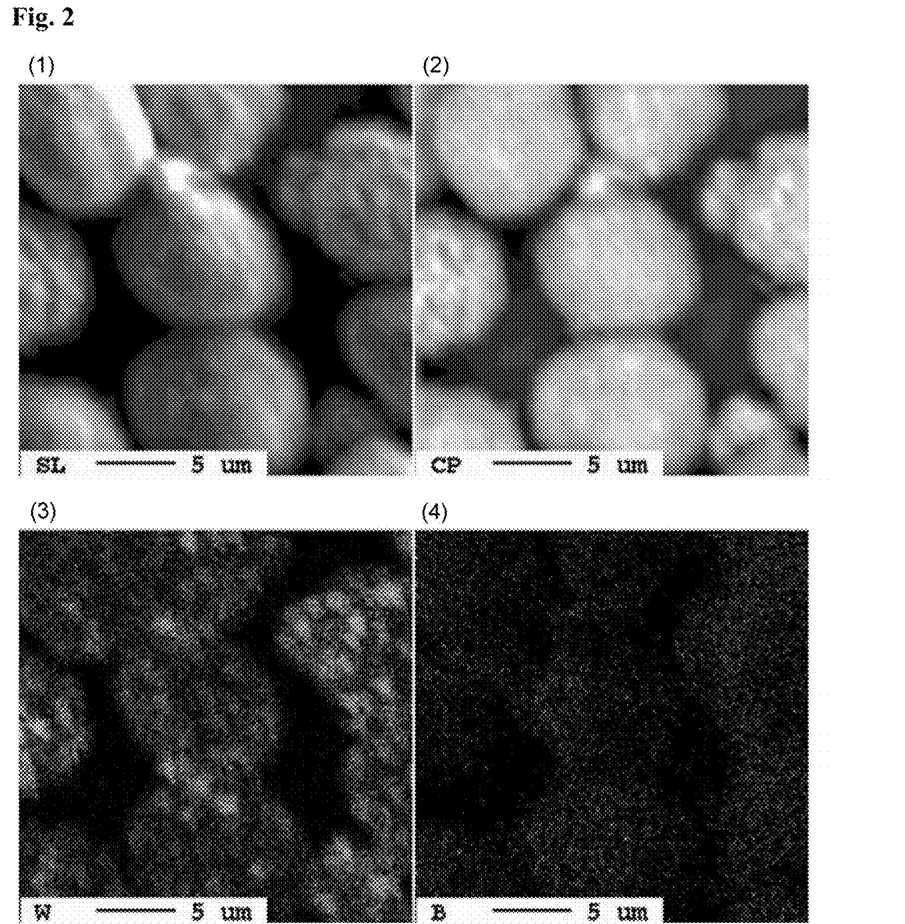
FIG. 2 is images including an secondary electron image (1), backscattered electron image (2), elemental distribution image for tungsten (3) and elemental distribution image for boron (4) using electron beam microanalyzer (EPMA) regarding an example of a positive electrode active material for comparison which does not contain boron in the surface layer.
Figure 3:
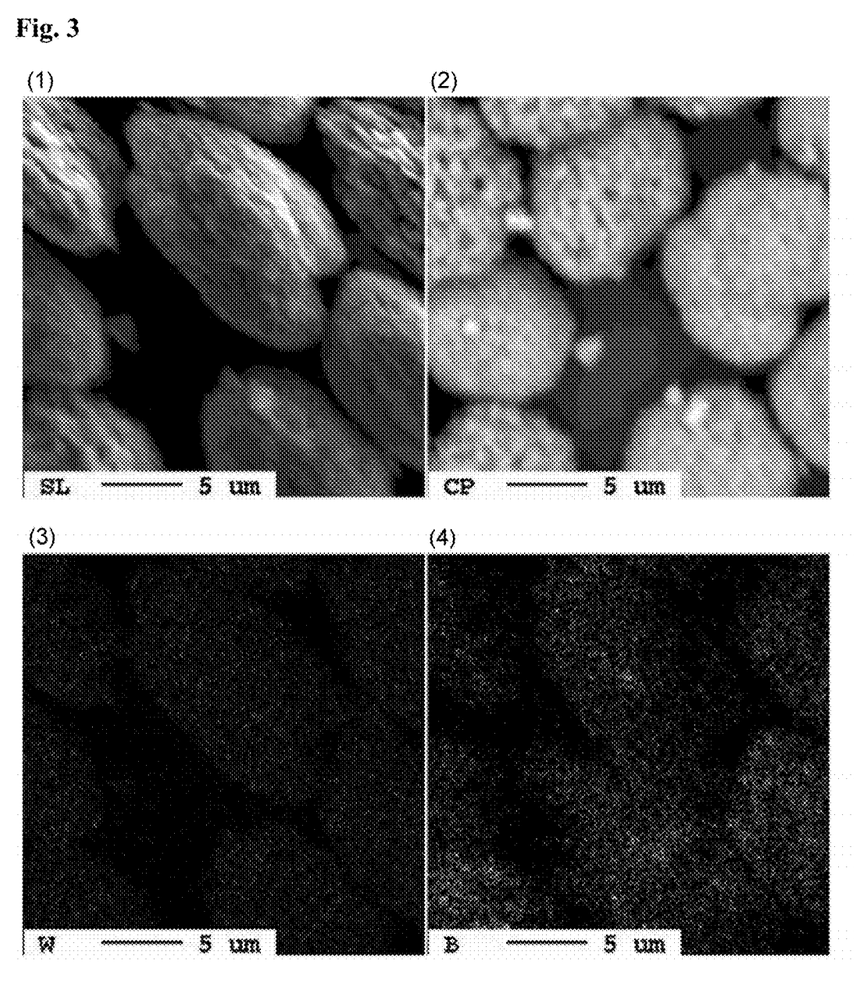

FIG. 1 is an image of electron beam microanalyzer (EPMA) for an example of a positive electrode active material according to the present embodiment. FIG. 2 and FIG. 3 are respectively an image of electron beam microanalyzer (EPMA) for an example of a positive electrode active material, in which, FIG. 2 shows an example of a positive electrode active material which does not contain boron in the surface layer, and FIG. 3 shows an example of a positive electrode active material which does not contain tungsten in the surface layer. As shown in FIG. 1(4) and FIG. 3(4), the signal from boron has a some degree of strength that can be distinguished from the background signals (for example FIG. 2(4)), and positional differences in intensity in FIG. 1(4) and FIG. 3(4) is relatively small. This is assumed that a compound which contains boron is melt in heat treatment in a later operation and spread on the surface of the core particles in a film shape. Meanwhile, in FIG. 1(3) and FIG. 2(3), the signal from tungsten shows positional difference compared to that of boron. Therefore, it is assumed that at least a part of tungsten exist as a particulate compound.

The boron content, tungsten content, and oxygen content of the surface layer is not specifically limited and can be selected appropriately.

The boron content of the surface layer is preferably 2 mol % or less and more preferably 0.5 to 1.5 mol % with respect to the lithium transition metal composite oxide. When the boron content of the surface layer is 0.5 mol % or more with respect to the lithium transition metal composite oxide, the amount of gas generated during a high temperature preservation of the nonaqueous electrolyte secondary battery tends to be further reduced. When the boron content of the surface layer is 2 mol % or less with respect to the lithium transition metal composite oxide, the charge-discharge capacity of the nonaqueous electrolyte secondary battery tends to be improved.

The tungsten content of the surface layer is preferably 2 mol % or less, more preferably 0.2 to 1.8 mol %, and further preferably 1.0 to 1.8 mol % with respect to the lithium transition metal composite oxide. Further, the tungsten content of the surface layer may be 0.2 to 1.5 mol % with respect to the lithium transition metal composite oxide. When the tungsten content of the surface layer is 0.5 mol % or more with respect to the lithium transition metal composite oxide, the amount of gas generated during a high temperature preservation of the nonaqueous electrolyte secondary battery tends to be further reduced. When the tungsten content of the surface layer is 2 mol % or less with respect to the lithium transition metal composite oxide, the charge-discharge capacity of the nonaqueous electrolyte secondary battery tends to be improved.

The content of oxygen in the surface layer is not specifically limited. The content of oxygen in the surface layer is approximately matching the amount of oxygen with the case where boron and tungsten in the surface layer are present as oxides.

[Method of Producing Positive Electrode Active Material]

A method of producing a positive electrode active material comprises mixing core particles; a raw material compound (1) that is at least one compound selected from the group consisting of boron oxide, oxo-acid of boron, and salt of oxo-acid of boron; and tungsten oxide (VI) to obtain a raw material mixture (hereinafter may be referred to as "mixing step"), and heat treating said raw material mixture to obtain a heat-treated product (hereinafter may be referred to as "heat treating step").

<Mixing Step>

In the mixing step, the core particles, the raw material compound (1), and tungsten oxide (VI) are mixed and the raw material mixture is obtained. The degree of the mixing is not specifically limited as long as the core particles, the raw material compound (1) and tungsten oxide are not distinguishable each other. The mixing can be carried out by using a known mixing device. Examples of such a known mixing device include a high-speed shear-type mixer, a ball mill, a V-type mixer, and a stirring blender.

The core particles are, inclusive of preferable types, such that as described above. The raw material compound (1) is at least one compound selected from the group consisting of boron oxide, an oxo-acid of boron, and a salt of oxo-acid of boron. Boron oxide is preferably $B_2O_3$. Examples of the oxo-acid of boron includes $H_3BO_3$ (orthoboric acid, so-called boric acid) and $HBO_2$. Examples of the salt of the oxo-acid of boron include $Li_2B_4O_7$ and $NH_4B_5O_8$. The raw material compound (1) is preferably the oxo-acid of boron and the salt of the oxo-acid of boron, and more preferably at least one compound selected from the group consisting of $H_3BO_3$, $Li_2B_4O_7$ and $NH_4B_5O_8$, particularly $H_3BO_3$ which is easy to handle. The raw material compound (1) may be a single compound or may be a combination of a plurality of compound.

The mixing ratio of the core particles, the raw material compound (1), and tungsten oxide (VI) is not specifically limited, but a mixing ratio which can satisfy the boron content and the tungsten content of the surface layer as described above is preferable.

<Heat Treating Step>

In the heat treating step, the raw material mixture is heated and a heat-treated product is obtained. By the heat treating step, a surface layer containing boron, tungsten, and oxygen is formed on the surface of the core particles. Further, by the heat treating step, a heat-treated product which is a positive electrode active material according to the present embodiment can be obtained.

The temperature of the heat treating is not specifically limited, but preferably 600° C. or less, and more preferably 450° C. or less, and further preferably 200° C. to 450° C. When the temperature of the heat treating is 600° C. or less, excessive reaction between the core particles, the raw material compound (1) and tungsten oxide (VI), the core particles and the raw material compound (1), and/or the core particles and tungsten oxide (VI) is unlikely to occur and a positive electrode active material which allows for maintaining of the output characteristics due to the core particles can tend to be obtained. When the heat treating temperature is 200° C. or more, reducing effect on the generation of gas in the surface layer can tend to be sufficiently exhibited. The heat treating can be performed using an appropriate heating means such as an electric furnace, a gas furnace, an infrared heating furnace. The duration of heat treating differs according to the heat treating temperature, but generally 5 hours or more is considered to be sufficient. A longer duration of heat treating may not be disadvantageous, but generally, 48 hours is considered satisfactory. The atmosphere of the heat treating is not specifically limited, but an oxidizing atmosphere is preferable. Examples of the oxidizing atmosphere include an air atmosphere and an oxygen-containing atmosphere.

[Positive Electrode]

A positive electrode active material may be mixed with a known conductive material, an adhesive material, and so forth, to obtain a positive electrode mixture, which is then applied on a known positive electrode collector to form a positive electrode material layer. Thus, a positive electrode for an nonaqueous electrolyte secondary battery can be obtained. Examples of conductive material include natural graphite, artificial graphite, and acetylene black. Examples of binding agent include polyvinylidene fluoride, polytetrafluoroethylene, and polyamideacryl resin. Examples of positive electrode collector material include aluminum, nickel, and stainless steel.

[Nonaqueous Electrolyte Secondary Battery]

A nonaqueous electrolyte secondary battery which includes a positive electrode obtained with the use of a positive electrode active material can be obtained by using a positive electrode for nonaqueous electrolyte secondary battery, a known negative electrode for nonaqueous electrolyte secondary battery, a known nonaqueous electrolyte, a known separator, and so forth. The negative electrode, the nonaqueous electrolyte, a separator, and so forth for a nonaqueous electrolyte secondary battery are not specifically limited, and that described in JP 2002-075367A, JP 2011-146390A, and JP2006-12433A, the entire contents of those are incorporated in the present specification by reference.

EXAMPLES

Hereinafter, the present invention will be described more specifically However, the present invention is not just limited only to these illustrative and exemplary.

Example 1

In a reaction vessel, pure water in a stirring state was prepared and then an aqueous nickel sulfate solution, an aqueous cobalt sulfate solution and an aqueous manganese sulfate solution are added dropwise in a flow ratio that achieves Ni:Co:Mn of 6:2:2. After completion of the dropwise addition, a solution temperature is controlled to 50° C., and a given amount of an aqueous sodium hydroxide solution was added dropwise to obtain a precipitate of nickel-cobalt-manganese composite hydroxide. The obtained precipitate was washed with water, filtered, separated and then mixed with lithium carbonate and zirconium oxide (IV) so that Li:(Ni+Co+Mn):Zr becomes 1.05:1:0.005 to obtain a mixed raw material. The obtained mixed raw material was calcined under an air atmosphere at 830° C. for 15 hours to obtain a calcinated body. The obtained calcinated body was ground and then dry-sieved to obtain core particles comprising a lithium transition metal composite oxide represented by the composition formula: $Li_{1.05}Ni_{0.6}Co_{0.2}Mn_{0.2}Zr_{0.005}O_2$. The median diameter of the core particles was 6.0 μm. The median diameter was measured by laser diffraction method.

The obtained core particles, the row material compound (1) that is a 0.5 mol % of boric acid in terms of boron content with respect to the lithium transition metal composite oxide for the core particles, and a 0.5 mol % of tungsten oxide (VI) in terms of tungsten with respect to the lithium transition metal composite oxide for the core particles were mixed in a high speed shear type mixer to obtain the raw material mixture. The obtained raw material mixture was heat treated in the atmosphere at 400° C. for 10 hours to obtain a positive electrode active material.

Example 2

A positive electrode active material was obtained in a similar manner as in Example 1 except that as the raw material compound (1), a 1.3 mol % of boric acid in terms of boron content with respect to the lithium transition metal composite oxide for the core particles was used.

Example 3

A positive electrode active material was obtained in a similar manner as in Example 1 except that as the raw material compound (1), a 1.8 mol % of boric acid in terms of boron content with respect to the lithium transition metal composite oxide for the core particles was used.

Example 4

A positive electrode active material was obtained in a similar manner as in Example 1 except that a 1.3 mol % of tungsten oxide (VI) in terms of tungsten content with respect to the lithium transition metal composite oxide for the core particles was used.

Example 5

A positive electrode active material was obtained in a similar manner as in Example 1 except that a 1.8 mol % of tungsten oxide (VI) in terms of tungsten content with respect to the lithium transition metal composite oxide for the core particles was used.

Example 6

A positive electrode active material was obtained in a similar manner as in Example 1 except that the heat treatment temperature was 500° C.

Example 7

A positive electrode active material was obtained in a similar manner as in Example 1 except that as the raw material compound (1), a 0.5 mol % of lithium tetraborate in terms of boron content with respect to the lithium transition metal composite oxide for the core particles was used.

Example 8

A positive electrode active material was obtained in a similar manner as in Example 1 except that as the raw material compound (1), a 0.5 mol % of ammonium pentaborate in terms of boron content with respect to the lithium transition metal composite oxide for the core particles was used.

Comparative Example 1

The core particles obtained in Example 1 were used as the positive electrode active material of Comparative Example 1.

Comparative Example 2

A positive electrode active material was obtained in a similar manner as in Example 1 except that boric acid was not used.

Comparative Example 3

A positive electrode active material was obtained in a similar manner as in Example 1 except that tungsten oxide (VI) was not used.

[Evaluation of Output Characteristics]

With respect to Examples 1 to 8 and Comparative Examples 1 to 3, DC-IR (direct-current internal resistance) was measured in the following manner.

<1. Forming Positive Electrode>

A positive electrode slurry was prepared by dispersing 85 parts by weight of a positive electrode active material, 10 parts by weight of acetylene black, and 5.0 parts by weight of PVDF (polyvinylidene fluoride) in NMP (N-methyl-2-pyrrolidone). The obtained positive electrode slurry was coated on an aluminum foil which is a current collector and dried, and then compression-formed by a roll press and then cut into a given size to obtain individual positive electrodes.

<2. Forming Negative Electrode>

A negative electrode slurry was prepared by dispersing 97.5 parts by weight of artificial graphite, 1.5 parts by weight of CMC (carboxymethylcellulose), and 1.0 parts by weight of SBR (styrene butadiene rubber) in water. The obtained negative electrode slurry was coated on a copper foil which is a current collector and dried, and then compression-formed by a roll press machine and cut into pieces with a predetermined size to obtain individual negative electrodes.

<3. Forming Nonaqueous Electrolyte>

A mixed solvent was prepared by mixing EC (ethylene carbonate) and MEC (methylethyl carbonate) at a volume ratio of 3:7 (EC:MEC=3:7). Lithium hexafluorophosphate ($LiPF_6$) was dissolved in the obtained mixed solvent so that the concentration becomes 1 mol/l to obtain a nonaqueous electrolyte.

<4. Assembling Battery for Evaluation>

A lead electrode was attached to each current collector of the positive and negative electrodes, followed by vacuum drying at 120° C. Then, a separator made of porous polyethylene was provided between the positive electrode and the negative electrode, and they were placed in a bag-shaped laminate pack. After that, moisture adsorbed to each member was removed by vacuum drying at 60° C. After vacuum drying, the aforementioned nonaqueous electrolyte was injected into the laminate pack, followed by sealing to obtain a laminate-type nonaqueous electrolyte secondary battery for evaluation.

<5. Measuring DC-IR>

The obtained secondary battery was aged with a micro current thereby allowing the electrolyte to permeate sufficiently into the positive and negative electrodes. Then, high-current discharging and micro-current charging were alternately repeated. The charging capacity at the 10th charging was indicated as the total charging capacity of the battery, and after 10th discharging, 40% of the total charging capacity was charged. After charging, the battery was put in a constant temperature bath set at T° C., and was left for 6 hours, and then discharged at 0.02 A, 0.04 A and 0.06 A to measure respective voltage. The current was arranged on a horizontal axis and the voltage was arranged on a vertical axis, and intersection points were plotted. The absolute value of the slope of the straight line obtained by connecting the plots was determined as DC-IR which is indicated by R(T). A low R(T) indicates good output characteristics.

[Measuring Gas Generation Amount]

With respect to the positive electrode active material of Examples 1 to 8 and Comparative Example 1, amount of the gas generated during high temperature preservation of the respective nonaqueous electrolyte secondary battery was measured in the following manner.

The secondary battery for evaluation was put in a constant temperature bath of 25° C., and was aged with a micro current thereby allowing the electrolyte to permeate sufficiently into the positive and negative electrodes. Then, constant current-constant voltage charge was carried out at a charge potential of 4.4 V and a charging current of 0.2 C (1 C: current value required to complete discharge within 1 hour from a fully charged state). The charging was completed at the charging current of 0.001 C. After the completion of charging, the secondary battery for evaluation was place in a constant temperature bath of 80° C., and preserved for 24 hours. After the preservation, the secondary battery for evaluation was sufficiently cooled under the atmosphere at 25° C. After cooling, the volume change of the secondary battery for evaluation before and after the preservation was measures to determine the gas generation amount Vg during the preservation. The volume change was determined by measuring the volume of the secondary battery for evaluation before and after the preservation based on the principle of Archimedes and calculating the difference.

With regard to Examples 1 to 8 and Comparative Examples 1 to 3, producing conditions of the respective positive electrode active material are shown in Table 1, and a output characteristics at 25° C. and −25° C. and gas generation amount are shown in Table 2.

TABLE 1

| | Core Particle | Raw Material Compound (1) | Boron Content* | Tungsten Content** | Heat Treatment Temperature |
|---|---|---|---|---|---|
| Example 1 | $Li_{1.05}Ni_{0.6}Co_{0.2}Mn_{0.2}Zr_{0.005}O_2$ | $H_3BO_3$ | 0.5 mol % | 0.5 mol % | 400° C. |
| Example 2 | $Li_{1.05}Ni_{0.6}Co_{0.2}Mn_{0.2}Zr_{0.005}O_2$ | $H_3BO_3$ | 1.3 mol % | 0.5 mol % | 400° C. |
| Example 3 | $Li_{1.05}Ni_{0.6}Co_{0.2}Mn_{0.2}Zr_{0.005}O_2$ | $H_3BO_3$ | 1.8 mol % | 0.5 mol % | 400° C. |
| Example 4 | $Li_{1.05}Ni_{0.6}Co_{0.2}Mn_{0.2}Zr_{0.005}O_2$ | $H_3BO_3$ | 0.5 mol % | 1.3 mol % | 400° C. |
| Example 5 | $Li_{1.05}Ni_{0.6}Co_{0.2}Mn_{0.2}Zr_{0.005}O_2$ | $H_3BO_3$ | 0.5 mol % | 1.8 mol % | 400° C. |
| Example 6 | $Li_{1.05}Ni_{0.6}Co_{0.2}Mn_{0.2}Zr_{0.005}O_2$ | $H_3BO_3$ | 0.5 mol % | 0.5 mol % | 500° C. |
| Example 7 | $Li_{1.05}Ni_{0.6}Co_{0.2}Mn_{0.2}Zr_{0.005}O_2$ | $Li_2B_4O_7$ | 0.5 mol % | 0.5 mol % | 400° C. |
| Example 8 | $Li_{1.05}Ni_{0.6}Co_{0.2}Mn_{0.2}Zr_{0.005}O_2$ | $NH_4B_5O_8$ | 0.5 mol % | 0.5 mol % | 400° C. |
| Comparative Example 1 | $Li_{1.05}Ni_{0.6}Co_{0.2}Mn_{0.2}Zr_{0.005}O_2$ | — | 0 | 0 | — |
| Comparative Example 2 | $Li_{1.05}Ni_{0.6}Co_{0.2}Mn_{0.2}Zr_{0.005}O_2$ | — | 0 | 0.5 mol % | 400° C. |
| Comparative Example 3 | $Li_{1.05}Ni_{0.6}Co_{0.2}Mn_{0.2}Zr_{0.005}O_2$ | $H_3BO_3$ | 0.5 mol % | 0 | 400° C. |

*as boron with respect to the core particles
**as element $M^2$ with respect to the core particles

TABLE 2

| | R(25)/Ω | R(−25)/Ω | Vg/cm³ |
|---|---|---|---|
| Example 1 | 1.44 | 13.4 | 0.36 |
| Example 2 | 1.43 | 13.2 | 0.33 |
| Example 3 | 1.43 | 13.4 | 0.35 |
| Example 4 | 1.42 | 12.5 | 0.27 |
| Example 5 | 1.39 | 11.9 | 0.27 |
| Example 6 | 1.38 | 11.7 | 0.39 |
| Example 7 | 1.48 | 13.6 | 0.32 |
| Example 8 | 1.48 | 13.5 | 0.30 |
| COMPARATIVE EXAMPLE 1 | 1.49 | 15.0 | 1.00 |
| COMPARATIVE EXAMPLE 2 | 1.44 | 14.1 | 0.51 |

TABLE 2-continued

|  | R(25)/Ω | R(−25)/Ω | Vg/cm³ |
|---|---|---|---|
| COMPARATIVE EXAMPLE 3 | 1.47 | 14.3 | 0.56 |

From the results shown in Table I and Table 2, the below can be summarized. With regard to Comparative Examples 2 and 3, compared to Comparative Example 1, it can be seen that the output characteristics of the nonaqueous electrolyte secondary battery were improved and the gas generation amount was suppressed. This is thought to be due to the presence of the surface layer which contains boron and oxygen or tungsten and oxygen in the positive electrode active material of Comparative Examples 2 and 3. With regard to Examples 1 to 8, compared to Comparative Examples 2 and 3, it can be seen that the output characteristics of the nonaqueous electrolyte secondary battery were improved and the gas generation amount was suppressed. This is thought to be due to the presence of the surface layer which contains boron, tungsten, and oxygen in the positive electrode active material of Examples 1 to 8.

INDUSTRIAL APPLICABILITY

When a nonaqueous electrolyte secondary battery using a positive electrode active material according to the present embodiments is preserved at high temperature, the amount of generation of gas is reduced. Further, the positive electrode active material according to the present embodiments can improve output characteristics of a nonaqueous electrolyte secondary battery. The nonaqueous electrolyte secondary batteries as described above can be suitable for use in a severe operating environment and that requires higher output and higher energy density, in particular use in the vehicle and the like.

All publications, patent applications, and technical standards mentioned in this specification are herein incorporated by reference to the same extent as if each individual publication, patent application, or technical standard was specifically and individually indicated to be incorporated by reference.

As described above, it should be obvious that various other embodiments are possible without departing the spirit and scope of the present invention. Accordingly, the scope and spirit of the present invention should be limited only by the following claims.

What is claimed is:

1. A method of producing a positive electrode active material for non-aqueous electrolyte secondary battery, the method comprising:
mixing core particles; a raw material compound (1) that is at least one compound selected from the group consisting of boron oxide, an oxo acid of boron, and a salt of an oxo acid of boron; and tungsten oxide (VI) to obtain a raw material mixture, wherein the core particles comprise a lithium transition metal composite oxide represented by the general formula:

$$Li_aNi_{1-x-y}Co_xM^1_yM^2_zO_2$$

wherein $1.00 \leq a \leq 1.50$, $0.00 \leq x \leq 0.50$, $0.00 \leq y \leq 0.50$, $0.00 \leq z \leq 0.02$, $0.00 \leq x+y \leq 0.70$, $M^1$ is at least one element selected from the group consisting of Mn and Al, $M^2$ is at least one element selected from the group consisting of Zr, Ta, Nb and Mo; and heat-treating the raw material mixture to obtain a heat-treated product.

2. The method according to claim 1, wherein the raw material compound (I) is at least one compound selected from the group consisting of $H_3BO_3$, $Li_2B_4O_7$ and $NH_4B_5O_8$.

3. The method according to claim 1, wherein the raw material compound (1) is $H_3BO_3$.

4. The method according to claim 1, wherein a temperature of the heat treatment is 600° C. or less.

5. The method according to claim 1, wherein a temperature of the heat treatment is 450° C. or less.

6. The method according to claim 2, wherein the raw material compound (1) is $H_3BO_3$.

7. The method according to claim 2, wherein a temperature of the heat treatment is 600° C. or less.

8. The method according to claim 2, wherein a temperature of the heat treatment is 450° C. or less.

9. The method according to claim 6, wherein a temperature of the heat treatment is 600° C. or less.

10. The method according to claim 6, wherein a temperature of the heat treatment is 450° C. or less.

* * * * *